US009965414B2

(12) United States Patent
Avudaiyappan et al.

(10) Patent No.: US 9,965,414 B2
(45) Date of Patent: *May 8, 2018

(54) SYSTEMS AND METHODS FOR MANAGING INTER-CPU INTERRUPTS BETWEEN MULTIPLE CPUS

(71) Applicant: Intel Corporation, Santa Clara, CA (US)

(72) Inventors: Karthikeyan Avudaiyappan, Sunnyvale, CA (US); Aleksey Gorelov, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/603,407

(22) Filed: May 23, 2017

(65) Prior Publication Data
US 2017/0255576 A1    Sep. 7, 2017

Related U.S. Application Data

(63) Continuation of application No. 14/515,379, filed on Oct. 15, 2014, now Pat. No. 9,678,903.

(51) Int. Cl.
G06F 13/26    (2006.01)

(52) U.S. Cl.
CPC ................... G06F 13/26 (2013.01)

(58) Field of Classification Search
CPC ... G05B 2219/13086; G06F 2213/2414; G06F 13/26
USPC ....................... 710/264, 268, 267
See application file for complete search history.

(56) References Cited

U.S. PATENT DOCUMENTS

| 4,420,806 | A | 12/1983 | Johnson, Jr. et al. |
| 5,664,200 | A | 9/1997 | Barlow et al. |
| 5,850,558 | A | 12/1998 | Qureshi et al. |
| 7,162,559 | B1 | 1/2007 | Kallat et al. |
| 2003/0154337 | A1 | 8/2003 | Ohno et al. |
| 2005/0193260 | A1 | 9/2005 | Kato |
| 2007/0083865 | A1 | 4/2007 | Hemmi |
| 2007/0245164 | A1 | 10/2007 | Mitarai |
| 2008/0005794 | A1 | 1/2008 | Inoue et al. |
| 2008/0086729 | A1 | 4/2008 | Kondoh et al. |
| 2010/0251017 | A1 | 9/2010 | Yamada et al. |

(Continued)

OTHER PUBLICATIONS

Non-Final Office Action from U.S. Appl. No. 14/515,379, dated Dec. 9, 2016, 8 pages.

(Continued)

Primary Examiner — Christopher Shin
(74) Attorney, Agent, or Firm — NDWE, LLP

(57) ABSTRACT

Methods for managing inter-CPU interrupts between sending and receiving CPUs are disclosed. As a part of a method, a target CPU identifier and an interrupt number is written in an interrupt send register of an interrupt sending CPU, the interrupt number is written into one of a plurality of locations of an interrupt receive register corresponding to the target CPU, an identifier of the location of the highest priority interrupt of a plurality of interrupts received by the interrupt receive register is written in an interrupt pick register, the interrupt pick register is read to determine the highest priority interrupt and a matrix associated with the target CPU is read to determine the sender of the highest priority interrupt. The highest priority interrupt is processed.

20 Claims, 5 Drawing Sheets

(56) References Cited

U.S. PATENT DOCUMENTS

2013/0185469 A1 7/2013 Motai et al.
2016/0041850 A1 2/2016 Hirata et al.

OTHER PUBLICATIONS

Notice of Allowance from U.S. Appl. No. 14/515,379, dated Feb. 8, 2017, 5 pages.

SYSTEMS AND METHODS FOR MANAGING INTER-CPU INTERRUPTS BETWEEN MULTIPLE CPUS

CROSS-REFERENCE TO RELATED APPLICATIONS

This application is a continuation of U.S. application Ser. No. 14/515,379, filed Oct. 15, 2014 (now U.S. Pat. No. 9,678,903, issued Jun. 13, 2017), which is hereby incorporated by reference.

BACKGROUND

A central processing unit (CPU) is the hardware within a computer that carries out the instructions of a computer program by performing the basic arithmetical, logical, and input/output operations of the system. The form, design, and implementation of CPUs have changed over the course of their history, but their fundamental operation remains much the same.

A computer can have more than one CPU. Utilizing more than one CPU is called multiprocessing. Most CPUs are microprocessors, indicating it is contained on a single chip. Some integrated circuits (ICs) can contain multiple CPUs on a single chip. Those ICs are called multi-core processors.

An inter thread/CPU interrupt (ITI) is a special type of interrupt by which one processor may interrupt another processor in a multiprocessor system if the interrupting processor requires action from the other processor. Actions that might be requested include: (1) flushes of memory management unit caches, such as translation lookaside buffers, on other processors when memory mappings are changed by one processor; and (2) stopping when the system is being shut down by one processor.

In conventional systems ITIs can be managed using an interrupt controller. The interrupt controller can be implemented using hardware components. However, the hardware components and circuitry required to implement the interrupt controller can be complex (involving many components), costly and require a significant amount of space.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
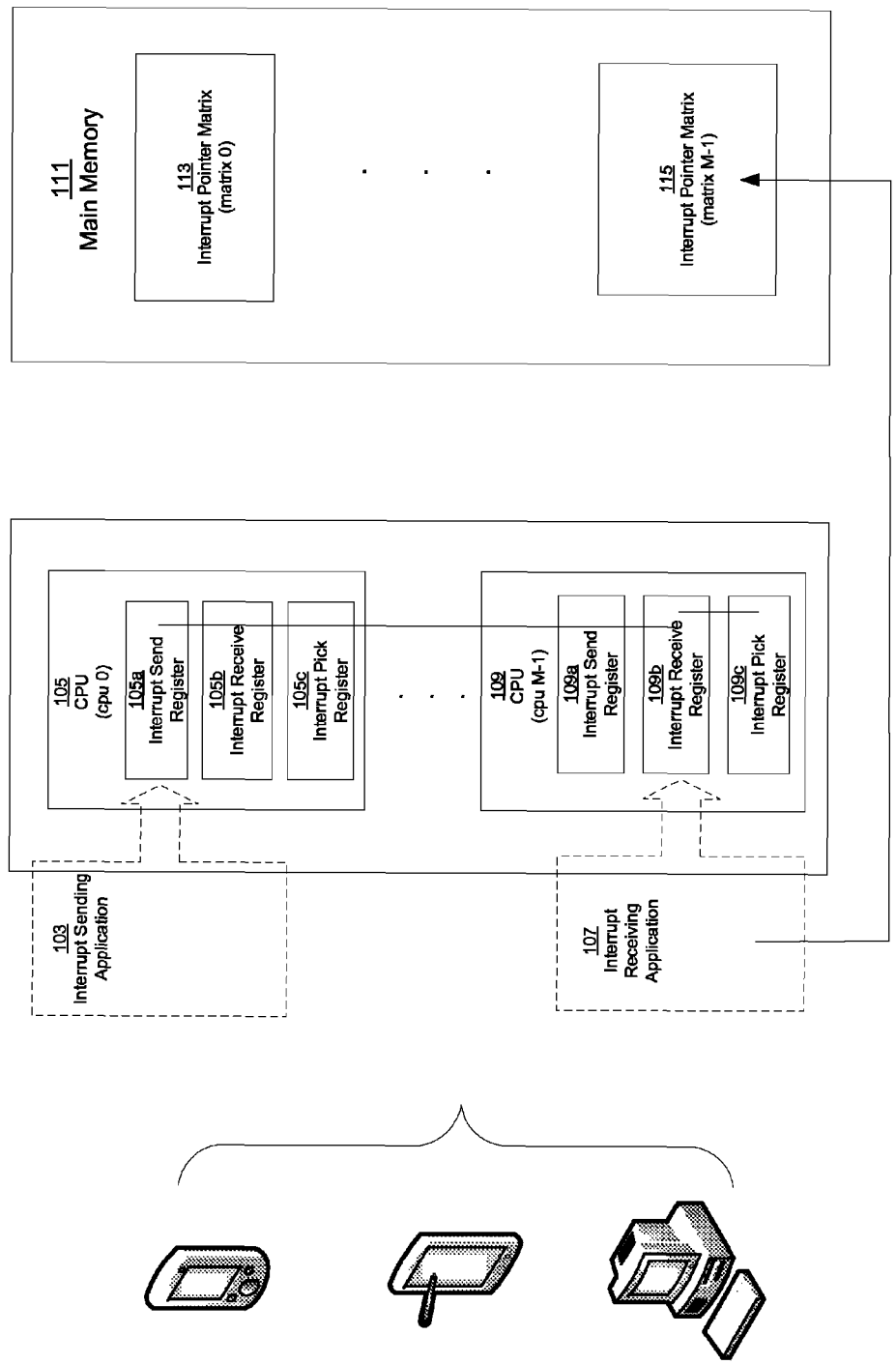
FIG. 1A shows an exemplary operating environment of a system for managing inter-CPU interrupts between multiple CPUs according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "writing" or "reading" or "processing" or "sending" or "receiving" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Some conventional systems use interrupt controllers to manage inter CPU interrupts. The hardware components and circuitry required to implement interrupt controllers can be complex (involving many components), costly and require a significant amount of space. Methods for managing inter- CPU interrupts between sending and receiving CPUs are disclosed that address these shortcomings. As a part of a method, a target CPU identifier and an interrupt number is written in an interrupt send register of an interrupt sending CPU, the interrupt number is written into one of a plurality of locations of an interrupt receive register corresponding to the target CPU, an identifier of the location of the highest priority interrupt of a plurality of interrupts received by the interrupt receive register is written in an interrupt pick register, the interrupt pick register is read to determine the highest priority interrupt and a matrix associated with the target CPU is read to determine the sender of the highest priority interrupt. Thereafter, the highest priority interrupt is processed. Exemplary embodiments which use a few registers to facilitate the management of inter CPU interrupts, enable the simplification of the hardware required to manage inter CPU interrupts without compromising functionality Exemplary Operating Environment of a System for Managing Inter-CPU Interrupts Between Multiple CPUs According to One Embodiment FIG. 1A shows an exemplary operating environment 100 of a system 101 for managing inter-CPU interrupts between multiple CPUs according to one embodiment. System 101 enables CPUs to interrupt each other without using an interrupt controller. Moreover, individual CPUs can send interrupts to multiple targets without relying on an interrupt controller. Consequently, a lightweight interrupt mechanism with all of the functionality of conventional interrupt systems is provided. In the FIG. 1A embodiment, system 101 includes interrupt sending application 103, sender CPU 105, sender interrupt send register 105a, sender interrupt receive register 105b, sender interrupt pick register 105c, interrupt receiving application 107, receiver CPU 109, receiver interrupt send register 109a, receiver interrupt receive register 109b, receiver interrupt pick register 109c, main memory 111, sender interrupt pointer matrix 113 and receiver interrupt pointer matrix 115.

Referring to FIG. 1A, sender interrupt send register 105a provides receiver interrupt receive register 109b access to a target CPU ID value and an interrupt number. In one embodiment, interrupt sending application 103 can write a target CPU ID (identification) value and an interrupt number in sender interrupt send register 105a. In one embodiment, each write to sender interrupt send register 105a can cause a delivery of an interrupt to a target CPU. However, each delivered interrupt may not result in an ITI (inter CPU interrupt) exception. In one embodiment, a CPU (e.g., sender CPU 105) can deliver an ITI to multiple CPUs, including itself, based on a single write to a sender interrupt send register (e.g., 105a). Table 1 below provides a description of sender interrupt send register 105a.

TABLE 1

| Width | Field | Description |
|---|---|---|
| 31:26 | INUM | Interrupt Number of ITI |
| 25:0 | TID | Target CPU ID bits<br>To Deliver an Interrupt to CPU I, set TID[I] to a 1 e.g., TID[0] is Set to 1 to Deliver Interrupt to CPU 0.<br>To Deliver Interrupt to Multiple CPUs With a Single Write to interrupt send register, Multiple TIO Bits Can be Set to 1 |

Receiver interrupt receive register 109b stores IT is that are provided from sender interrupt send register 105a. Receiver interrupt receive register 109b accesses ITI interrupts from sender interrupt send registers of CPUs associated with a sending CPU (e.g., sender CPU 105). In one embodiment, when an interrupt receiving CPU (e.g., receiver/target CPU 109) receives an ITI, interrupt receiving application 107 can set a bit in receiver interrupt receive register 109b that identifies the received interrupt number. In one embodiment, if an ITI causes the setting of a bit from 0 to 1, an ITI exception is raised. In one embodiment, if an interrupt is received and the bit is already set for that interrupt number in receiver interrupt receive register 109b, a new ITI exception may not be signaled to receiver CPU 109. In response to an ITI exception, the interrupt receiving application 107 can acknowledge an interrupt by writing a 0 to an interrupt number bit. In one embodiment, the write data that is provided to receiver interrupt receive register 109b is AND-ed with the interrupt receive register value (the value stored by receiver interrupt receive register 109b) and then is written into receiver interrupt receive register 109b. In one embodiment, if the writing of 0 to a bit of receiver interrupt receive register 109b coincides with a setting of the same bit to 1, the write is ignored and a new ITI exception is raised. Table 2 below provides a description of receiver interrupt receive register 109b.

TABLE 2

| Width | Field | Description |
|---|---|---|
| 63:0 | INUM | When ITI Is Received a Bit is Set |

Receiver interrupt pick register 109c returns the highest priority outstanding interrupt number with its valid bit set to 1. In one embodiment, if no interrupt is received, a read to interrupt pick register 109c will return all 0s. In one embodiment, a read to interrupt pick register 109c can also cause a resetting of the bit in interrupt receive register 109b of the interrupt number being returned as read data. In one embodiment, if a read to interrupt pick register 109c and the resulting resetting of a bit in interrupt receive register 109b coincides with a setting of the same bit in interrupt receive register 109b to a 1, the interrupt receive register 109b bit is not reset and a new ITI exception is raised. Table 3 below provides a description of receiver interrupt pick register 109c.

TABLE 3

| Width | Field | Description |
|---|---|---|
| 31 | VALID | 1'd1—Interrupt Number Field of IPR is Valid<br>1'd0—Interrupt Number Field of IPR is not Valid |
| 30:6 | Reserved | |
| 5:0 | INUM | Interrupt Number of the Highest Received Interrupt in IRR.<br>Interrupts Ordered From 0 to 63, with 0 Being the Highest Priority Interrupt |

Interrupt sending application 103 is the application from which an interrupt is originated and interrupt receiving application 107 is the application whose processes are interrupted by the interrupt. In one embodiment, although labeled, for illustrative purposes, to indicate a role played at a point in time in inter CPU interrupt operations, applications that are a part of the inter CPU operations that are disclosed herein, such as interrupt sending application 103 and interrupt receiving application 107, can act both as interrupt senders and interrupt receivers. In one embodiment, interrupt sending application 103 and interrupt receiving application 107 can operate in accordance with an application programming interface protocol that dictates the operations that are carried out as a part of inter CPU interrupt processes described herein. In one embodiment, the operations can include but are not limited to writing to interrupt send register (e.g., 105*a* and 109*a*), setting a bit in interrupt receive register (e.g., 105*b* and 109*b*), reading interrupt pick register (e.g., 105*c* and 109*c*) and reading interrupt pointer matrices (e.g., 113 and 115).

Figure 1B:
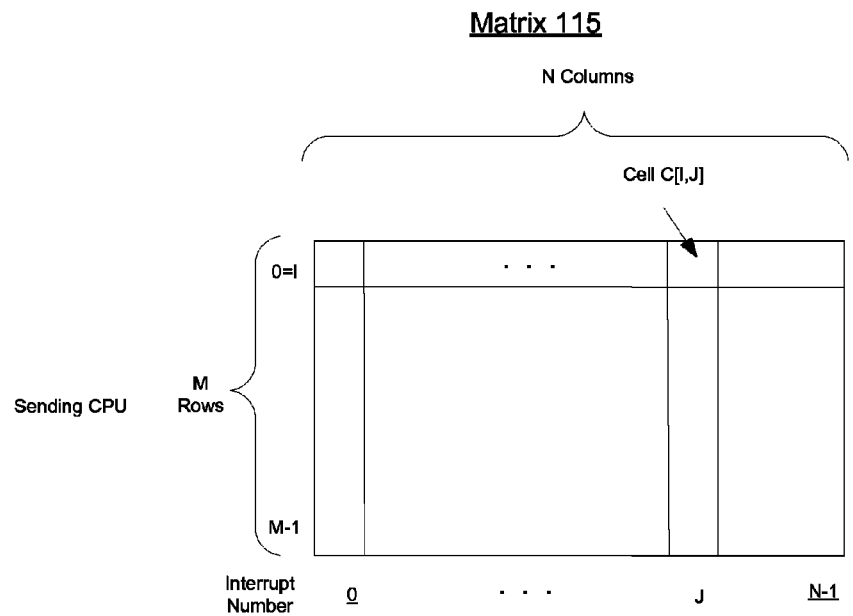
FIG. 1B shows a system with M CPUs that supports N interrupts according to one embodiment.

Interrupt pointer matrices 113 0-115 M-1 are tables in main memory 111 that correspond to CPUs 105 0 through 109 M-1. Each of the cells of interrupt pointer matrices 113 0-115 M-1 are pointers that point to a location in memory where an interrupt packet from a sender is kept. In one embodiment, each table can have M rows and N columns. FIG. 1B shows a matrix for a system with M CPUs that supports N interrupts. Referring to FIG. 1B, consider cell C[I,J] of interrupt pointer matrix 115 of CPU 109. This cell indicates that CPU I wants to send interrupt J to CPU 109. Cell C[I,J] stores the native physical address in main memory 111 where CPU I keeps interrupt packets before CPU I writes to a sender interrupt send register (e.g., 105 A in FIG. 1A) to deliver an interrupt J to CPU 109.

Referring again to FIG. 1A, when CPU 109 receives an interrupt and enters ITI handler (e.g., an interrupt handler triggered by the interrupt), it reads interrupt pick register 109*c*. In one embodiment, the read from interrupt pick register 109*c* returns the value of the interrupt number, which in the FIG. 1B example is J. In one embodiment, CPU 109 may not know the identity of the sender of the interrupt. However, based on the value ascertained from pick register 109*c*, CPU 109 is directed to scan each row of column J of the corresponding interrupt pointer matrix to process all pending interrupts from all senders. In one embodiment, a CPU can receive an interrupt, enter ITI handler, and find no valid interrupt packets.

In summary, system 101 enables inter CPU interruptions without an interrupt controller. System 101 uses send registers, receive registers, pick registers, and CPU matrices to enable one CPU to interrupt one or more other CPUs without the involvement of an interrupt controller. System 101 facilitates a reading of a matrix (e.g., 115) that is associated with a receiver CPU (e.g., receiver CPU 109) to determine the identity of a sender (e.g., sender CPU 105) of the highest priority interrupt. In one embodiment, the matrix is read after identifying the highest priority interrupt from a receiver interrupt pick register (e.g., 109*c*). The highest priority interrupt is placed in the receiver interrupt pick register after the interrupt is received by the interrupt receive register after being sent from the send register of the sender CPU. Thereafter, the highest priority interrupt is processed. It should be appreciated that the register characteristics described above are exemplary and other characteristics can be used (e.g., other numbers of CPUs and interrupts, other manners of identifying valid values, other manners of indicating interrupt numbers etc.).

Operation

Figure 1C:
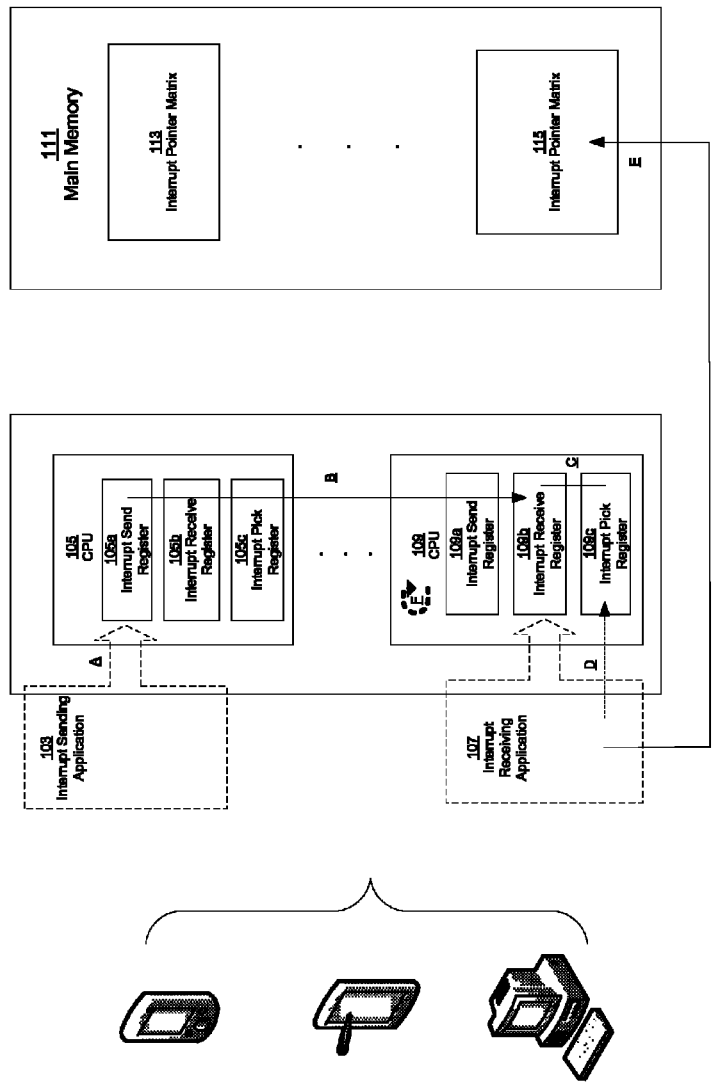
FIG. 1C illustrates operations performed by a system for managing inter-CPU interrupts according to one embodiment.
Figure 1D:
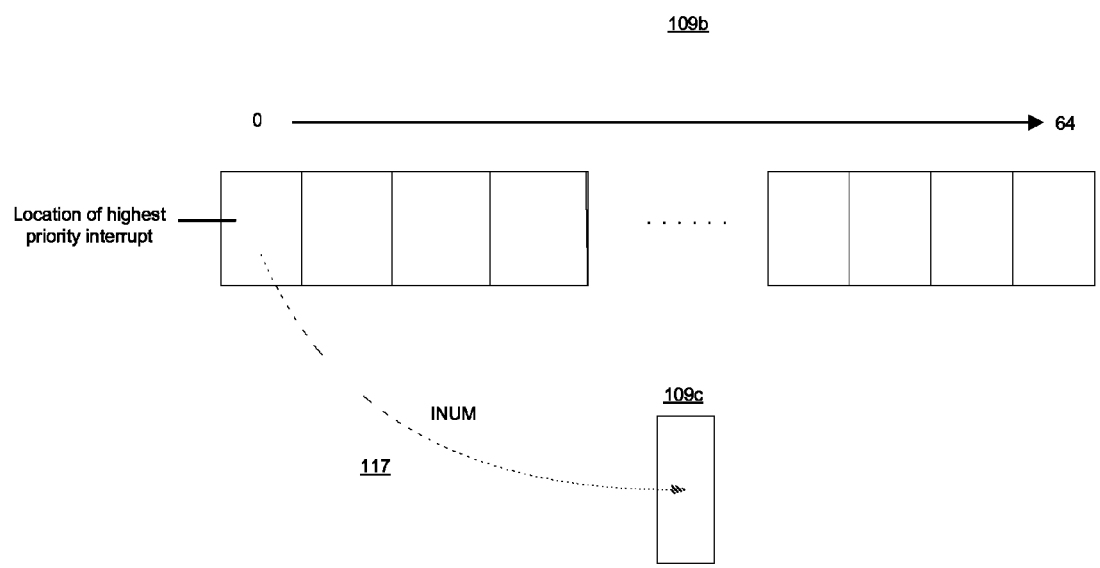
FIG. 1D illustrates the writing of the highest priority interrupt that is stored in a receiver interrupt receive register to a pick register.

FIGS. 1C and 1D illustrate operations performed by system 101 for managing inter-CPU interrupts according to one embodiment. These operations, which relate to a method for managing inter-CPU interrupts, are only exemplary. It should be appreciated that other operations not illustrated in FIGS. 1C and 1D can be performed in accordance with one embodiment.

Referring to FIG. 1C, at A, a target CPU identifier and an interrupt number is written in a send register of a sending CPU (shown in FIG. 1C by dashed box with arrow representing interrupt sending application 103 causing the writing of an interrupt number into send register 105*a*).

At B, the interrupt number is written in one of a plurality of locations of an interrupt receive register corresponding to a target CPU (illustrated in FIG. 1C by straight line with arrow that represents the movement of the interrupt number from interrupt send register 105*a* to receiver interrupt receive register 109*b*).

At C, an identifier of the location of the highest priority interrupt of a plurality of interrupts received in the receive register is written in a pick register. Referring to FIG. 1D, curved arrow 117 illustrates the identification of the highest priority interrupt that is stored in receiver interrupt receive register 109*b* and the writing of the identifier to pick register 109*c*.

Referring again to FIG. 1C, at D, the interrupt pick register is read to determine the highest priority interrupt (illustrated in FIG. 1C by the straight dashed line with arrow that represents the reading of pick register 109*c* by interrupt receiving application 107).

At E, a matrix associated with the target CPU is read to determine the sender of the highest priority interrupt (illustrated in FIG. 1C by the solid line arrow that represents the reading of interrupt pointer matrix 115 by interrupt receiving application 107).

At F, the highest priority interrupt is processed by the target CPU (illustrated by circular arrow representing processing of interrupt).

Figure 2:
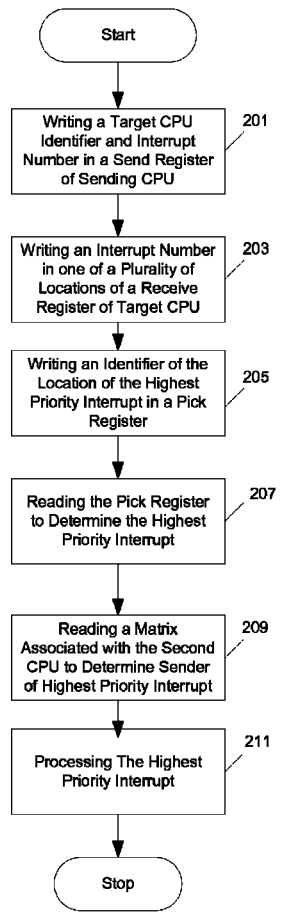
FIG. 2 shows a flowchart of the steps performed in a method for managing inter-CPU interrupts between multiple CPUs according to one embodiment.

Method for Managing Inter-CPU Interrupts Between Multiple CPUs According to One Embodiment FIG. 2 shows a flowchart 200 of the steps performed in a method for managing inter-CPU interrupts between multiple CPUs according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 2, at 201, a target CPU identifier and an interrupt number is written into an interrupt send register of a sending CPU (e.g., interrupt send register of CPU 105 in FIG. 1A).

At 203, the interrupt number is written into one of a plurality of locations of an interrupt receive register (interrupt receive register 109*b* in FIG. 1A) corresponding to the interrupt receiving CPU (e.g., the target CPU; 109 in FIG. 1A).

At 205, an identifier of the location of the highest priority interrupt of a plurality of interrupts received into an interrupt receive register (interrupt receive register 109*b* in FIG. 1A) is written into a pick register (e.g., interrupt pick register 109*c* in FIG. 1A).

At 207, the pick register (e.g., interrupt pick register 109*c* in FIG. 1A) is read to determine the highest priority interrupt.

At 209, a matrix associated with the interrupt receiving/target CPU (e.g., CPU 109 in FIG. 1A) is read to determine the sender of the highest priority interrupt.

At 211, the highest priority interrupt is processed.

With regard to exemplary embodiments thereof, systems and methods for managing inter-CPU interrupts between multiple CPUs are disclosed. As a part of a method, a target CPU identifier and an interrupt number is written in an interrupt send register of an interrupt sending CPU, the interrupt number is written into one of a plurality of locations of an interrupt receive register corresponding to the target CPU, an identifier of the location of the highest priority interrupt of a plurality of interrupts received by the interrupt receive register is written in an interrupt pick register, the interrupt pick register is read to determine the highest priority interrupt and a matrix associated with the target CPU is read to determine the sender of the highest priority interrupt. The highest priority interrupt is processed.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A non-transitory computer-readable medium having stored therein a set of instructions, which when executed by a computing device implemented a method for managing inter-processor interrupts via a set of operations, the set of operations comprising:
    writing a target processor identifier and an interrupt number in an interrupt send register of an interrupt sending processor;
    writing the interrupt number in one of a plurality of locations of an interrupt receive register corresponding to a target processor;
    writing an identifier of a location of a highest priority interrupt of a plurality of interrupts received in the interrupt receive register in an interrupt pick register;
    reading the interrupt pick register to determine the highest priority interrupt;
    reading a matrix associated with the target processor to determine a sender of the highest priority interrupt; and
    processing the highest priority interrupt.

2. The non-transitory computer-readable medium of claim 1 wherein the interrupt sending processor can send an interrupt to a plurality of processors via the interrupt send register.

3. The non-transitory computer-readable medium of claim 1 wherein when writing the interrupt number in one of a plurality of locations of the interrupt receive register a bit in the interrupt receive register is set which indicates the interrupt number.

4. The non-transitory computer-readable medium of claim 3 wherein if the bit in the interrupt receive register is inverted, then an exception is raised.

5. The non-transitory computer-readable medium of claim 1 wherein an interrupt can be acknowledged by writing to an interrupt number bit.

6. The non-transitory computer-readable medium of claim 1 wherein a read of the interrupt pick register elicits the highest priority interrupt number with a valid bit set.

7. The non-transitory computer-readable medium of claim 1 wherein a read of the interrupt pick register causes a resetting of a bit in the receive register corresponding to the interrupt number that is read.

8. The non-transitory computer-readable medium of claim 1 wherein the matrix is a pointer to a memory location in which an interrupt packet from a sender is stored.

9. A processor comprising:
    an interrupt send register to send a target processor identifier and an interrupt number;
    an interrupt receive register to receive interrupt numbers that are stored in one of a plurality of locations of the receive register;
    an interrupt pick register to store a highest priority interrupt number of the interrupt numbers that are received by the interrupt receive register; and
    a matrix reader to access a matrix to determine a sender of a highest priority interrupt.

10. The processor of claim 9 wherein writing to the interrupt send register can send an interrupt to a plurality of processors.

11. The processor of claim 9 wherein the interrupt receive register has a bit which when modified indicates a received interrupt number.

12. The processor of claim 11 wherein in response to a bit in the interrupt receive register being modified an exception is raised.

13. The processor of claim 9 wherein an interrupt can be acknowledged by writing to an interrupt number bit.

14. The processor of claim 9 wherein the interrupt pick register identifies the highest priority interrupt number with a corresponding valid bit set to 1.

15. The processor of claim 9 wherein the interrupt pick register causes a resetting of a bit in the interrupt receive register in response to a read of an interrupt number.

16. A computing device, comprising:
    a plurality of processors including a first processor, the first processor including an interrupt send register for sending a target processor identifier and an interrupt number to other processors in the plurality of processors, an interrupt receive register to store interrupt numbers that are received from other processors in the plurality of processors, an interrupt pick register to store a highest priority interrupt number of the interrupt numbers that are received by the interrupt receive register, and a matrix reader to access a matrix to determine a sender of a highest priority interrupt; and
    a memory device to store the matrix.

17. The computing device of claim 16 wherein writing to the interrupt send register can send an interrupt to the plurality of processors.

18. The computing device of claim 17 wherein the interrupt receive register has a bit which when set indicates a received interrupt number.

19. The computing device of claim 16 wherein an exception is generated in response to a bit the interrupt receive register being changed.

20. The computing device of claim 16 wherein an interrupt can be acknowledged by writing to an interrupt number bit.

* * * * *